United States Patent
Kriegel

(10) Patent No.: US 9,725,662 B2
(45) Date of Patent: Aug. 8, 2017

(54) METHOD AND MEMBRANE MODULE FOR THE ENERGY-EFFICIENT OXYGEN GENERATION DURING BIOMASS GASIFICATION

(71) Applicant: Fraunhofer-Gesellschaft zur Foerderung der angewandten Forschung e. V., Munich (DE)

(72) Inventor: Ralf Kriegel, Kahla (DE)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 80 days.

(21) Appl. No.: 14/782,252

(22) PCT Filed: Apr. 1, 2014

(86) PCT No.: PCT/DE2014/100111
§ 371 (c)(1),
(2) Date: Oct. 2, 2015

(87) PCT Pub. No.: WO2014/161531
PCT Pub. Date: Oct. 9, 2014

(65) Prior Publication Data
US 2016/0040081 A1 Feb. 11, 2016

(30) Foreign Application Priority Data
Apr. 5, 2013 (DE) .......... 10 2013 103 426

(51) Int. Cl.
*C10J 3/72* (2006.01)
*B01D 63/06* (2006.01)
(Continued)

(52) U.S. Cl.
CPC ........... *C10J 3/72* (2013.01); *B01D 63/06* (2013.01); *C01B 13/0251* (2013.01); *C10J 3/02* (2013.01);
(Continued)

(58) Field of Classification Search
CPC combination set(s) only.
See application file for complete search history.

(56) References Cited

U.S. PATENT DOCUMENTS 5,820,654 A * 10/1998 Gottzman ............ B01D 53/229
 95/39
5,820,655 A * 10/1998 Gottzmann ............ B01D 53/22
 422/173

(Continued)

FOREIGN PATENT DOCUMENTS

| EP | 0984500 A2 | 3/2000 |
|---|---|---|
| EP | 2026004 A1 | 2/2009 |

(Continued)

OTHER PUBLICATIONS

Hashim S S et al: Oxygen separation from air using ceramic-based membrane technology for sustainable fuel production and power generation . . . , Renewable and Sustainable Energy Reviews, Elseviers Science, New York, NY, US, vol. 15, No. 2, Feb. 1, 2011 (Feb. 1, 2011), pp. 1284-1293.

(Continued)

*Primary Examiner* — Kaity Chandler
(74) *Attorney, Agent, or Firm* — Abel Law Group, LLP

(57) ABSTRACT

Disclosed are a method and a membrane module for the separation of oxygen from air during biomass gasification. The method comprises employing a membrane module as disclosed herein and using gas exiting the membrane module to heat incoming fresh air, more than 50% of heat energy contained in the gas exiting the membrane module being
(Continued)

utilized to preheat the fresh air. The fresh air is further heated to a temperature of from 800° C. to 900° C. by directly feeding combustion gas or synthesis gas from the biomass gasification into a combustion space of the membrane module.

15 Claims, 4 Drawing Sheets

(51) Int. Cl.
  *C10J 3/02* (2006.01)
  *C01B 13/02* (2006.01)

(52) U.S. Cl.
  CPC ...... B01D 2313/23 (2013.01); B01D 2313/90 (2013.01); B01D 2319/04 (2013.01); C10J 2300/0916 (2013.01); C10J 2300/0959 (2013.01); C10J 2300/1606 (2013.01); C10J 2300/1618 (2013.01); C10J 2300/1678 (2013.01); C10J 2300/1846 (2013.01); C10J 2300/1869 (2013.01); C10J 2300/1884 (2013.01); Y02E 20/14 (2013.01); Y02E 20/18 (2013.01); Y02P 20/129 (2015.11); Y02P 20/13 (2015.11); Y02P 20/57 (2015.11)

(56) References Cited

U.S. PATENT DOCUMENTS

| | | | | |
|---|---|---|---|---|
| 5,852,925 | A * | 12/1998 | Prasad | B01D 53/22 60/39.52 |
| 5,901,547 | A | 5/1999 | Smith et al. | |
| 5,935,298 | A * | 8/1999 | Prasad | B01D 53/22 95/117 |
| 5,954,859 | A * | 9/1999 | Keskar | B01D 53/0462 95/288 |
| 6,139,604 | A | 10/2000 | Gottzmann et al. | |
| 6,293,084 | B1 * | 9/2001 | Drnevich | B01D 53/22 60/39.17 |
| 6,296,686 | B1 | 10/2001 | Prasad et al. | |
| 6,537,465 | B2 | 3/2003 | Gottzmann et al. | |
| 6,541,159 | B1 | 4/2003 | Li et al. | |
| 6,767,663 | B2 | 7/2004 | Li et al. | |
| 7,318,520 | B2 * | 1/2008 | Golben | F17C 11/005 165/104.12 |
| 8,506,678 | B2 | 8/2013 | Meulenberg et al. | |
| 9,004,909 | B2 * | 4/2015 | Ghoniem | F23L 7/007 431/2 |
| 9,021,814 | B2 | 5/2015 | Greeff | |
| 2001/0030127 | A1 | 10/2001 | Li et al. | |
| 2002/0127177 | A1 | 9/2002 | Gottzmann et al. | |
| 2005/0037299 | A1 | 2/2005 | Gottzmann et al. | |
| 2005/0058871 | A1 | 3/2005 | Li et al. | |
| 2010/0071381 | A1 | 3/2010 | Rollins, III | |
| 2010/0205968 | A1 | 8/2010 | Graeber et al. | |
| 2010/0263377 | A1 | 10/2010 | Meulenberg et al. | |
| 2010/0300111 | A1 | 12/2010 | Graeber et al. | |
| 2012/0067060 | A1 | 3/2012 | Greeff | |

FOREIGN PATENT DOCUMENTS

| | | |
|---|---|---|
| EP | 2067937 A2 | 6/2009 |
| WO | 0113453 A1 | 2/2001 |
| WO | 2008014481 A1 | 1/2008 |
| WO | 2008068596 A2 | 6/2008 |
| WO | 2009065374 A2 | 5/2009 |

OTHER PUBLICATIONS

Sunarso, J., Baumann, S., Serra, J.M., Meulenberg, W.A., Liu, S., Lin, Y.S., Diniz da Costa, J.C.: "Mixed ionic-electronic conducting (MIEC) ceramic-based membranes for oxygen separation", J. Membrane Sc. 320 (2008), 13-41.

Armstrong, P.A., Bennett, D.L., Foster, E.P., Stein, V.E.: "The New Oxygen Supply for the New IGCC Market", Gasification Techn. 2005, San Francisco, Oct. 9-12, 2005. http://www.oxycoal-ac.de/index.php?id=1099&L=0.

Schulz, M., Kriegel, R., Kämpfer, A.: "Assessment of CO2-stability and oxygen flux of oxygen permeable membranes", J. Membr. Sc. 378 (2011), pp. 10-17.

Shao, Z., Yang, W., Cong, Y., Dong, H., Tong, J., Xiong, G.: "Investigation of the permeation behavior and stability of a Ba0.5Sr0.5Co 0.8Fe0.2O3-delta Oxygen Membrane", J. of Membr. Sc. 172 (2000), pp. 177-188.

Pecanac, G., Baumann, S., Malzbender, J.: "Mechanical properties and lifetime predictions for Ba0.5Sr0.5Co0.8Fe0.2O3-delta membrane material", J. of Membr. Sc. 385-386 (2011), pp. 263-268.

Lu, H., Tong, J., Cong, Y., Yang, W.: "Partial oxidation of methane in Ba0.5Sr0.5Co0.8Fe0.2O3-delta membrane reactor at high pressures", Catalysis Today 104 (2005), pp. 154-159.

Arnold, M., Wang, H., Feldhoff, A.: Influence of CO2 on the oxygen permeation performance and the microstructure of perovskite-type (Ba0.5Sr0.5)Co0.8Fe0.2)O3-delta membranes, J. of Membr. Sc. 293 (2007), pp. 44-52.

* cited by examiner

METHOD AND MEMBRANE MODULE FOR THE ENERGY-EFFICIENT OXYGEN GENERATION DURING BIOMASS GASIFICATION

BACKGROUND OF THE INVENTION

Field of the Invention

The invention relates to a method and a membrane module for process-integrated oxygen generation during biomass gasification, wherein the oxygen is generated at high temperature via mixed conducting ceramic membranes.

Discussion of Background Information

Biomass gasification with air yields a nitrogen-containing synthesis gas having a calorific value generally no higher than 1.8 kWh per cubic meter SCM (standard cubic meter according to DIN 1343). This value cannot be surpassed even when using ideal qualities of raw material, e.g., dry beechwood chips. The gas engines developed for synthesis gases and mixed gases attain only low electrical efficiencies with lean gases of this kind such that power generation is not competitive. In order to increase the calorific value, gases with a higher calorific value, e.g., biomethane or natural gas, can be mixed in, but this appreciably increases fuel costs. Therefore, as an alternative to gasification with air, larger gasification installations are operated with oxygen. Owing to the resulting high gasification temperatures, steam is often mixed in with the oxygen for cooling (WO 2008/068596 A2).

Depending on the type of gasifier employed, the synthesis gas from biomass gasification contains various percentages of tar which must be removed before utilization in the combined heat and power plant (referred to hereinafter throughout as CHP plant). A reliable method for tar removal is to reheat the synthesis gas to approximately 1200° C., which can be achieved relatively easily by adding oxygen to the hot synthesis gas. Further, oxygen can also be used to increase the electrical output of gas engines or fuel cells, e.g., by increasing the oxygen content of the supplied combustion air.

Conventional production of oxygen is preferably carried out through pressure swing adsorption (PSA) or cryogenic air separation (Linde® process). Energy-optimized large-scale plants achieve minimum specific energy consumptions of 0.4 kWh$_{el}$/m$^3$ SCM O$_2$ (cryogenic) or 0.36 kWh$_{el}$/m$^3$ SCM O$_2$ (PSA). However, biomass gasification requires only comparatively small amounts of oxygen which are commonly provided through smaller PSA installations. These PSA installations need appreciably more than 1.0 kWh$_{el}$/m$^3$ SCM O$_2$ and, therefore, as a result of their own electrical power requirement, considerably reduce the economic return to the gasification plant or render it uneconomical. The use of oxygen from tanks or liquid storage tanks entails considerable expenditures for rental and transportation and has therefore also failed to gain popularity up to this point.

An alternative method for the production of oxygen is based on a membrane separation process at high temperatures. Mixed conducting ceramic membranes (MIEC—Mixed Ionic Electronic Conductors) are used for this purpose and enable a highly selective separation of oxygen. The oxygen transport relies on the transporting of oxide ions through the gastight ceramic material and the transporting of electronic charge carriers (electrons or electron holes) taking place simultaneously. Since the 1980s, a great number of ceramic materials have been investigated with respect to oxygen transport and further material characteristics (Sunarso, J., Baumann, S., Serra, J. M., Meulenberg, W. A., Liu, S., Lin, Y. S., Diniz da Costa, J. C.: Mixed ionic-electronic conducting (MIEC) ceramic-based membranes for oxygen separation, J. Membrane Sc. 320 (2008), 13-41).

Oxygen permeation through an MIEC membrane can be described by Wagner's equation and is determined primarily through the ambipolar conductivity of the material at operating temperature, the membrane thickness and through the driving force. The latter is given by the logarithmic ratio of oxygen partial pressure in the feed gas ($p_h$) to oxygen partial pressure in the sweep gas ($p_i$) or in the permeate. Consequently, in a given material with constant membrane thickness and fixed temperature, the oxygen flux through a MIEC membrane is proportional to $\ln(p_h/p_i)$. Accordingly, doubling $p_h$ on the feed gas side results in the same increase in oxygen flux as halving $p_i$ on the permeate side or sweep gas side. Consequently, in order to generate pure oxygen in plants utilizing membrane technology, the air can be compressed or the oxygen can be sucked out by vacuum. Of course, combined processes are also possible (Armstrong, P. A., Bennett, D. L., Foster. E. P., Stein. V. E.: The New Oxygen Supply for the New IGCC Market, Gasification Techn. 2005, San Francisco, 9-12 Oct. 2005). Compression of air is preferred for commercial plants because compressors are generally cheaper and more available than vacuum generators.

If the generated oxygen is needed for chemical reactions, the driving force can be generated most favorably in terms of energy by the sweeping of the MIEC membrane with low-oxygen gases. The oxy-coal AC process (http://www.oxycoal-ac.de/index.php?id=1099&L=0) for a coal-fired power plant, i.e., the combustion of coal in a CO$_2$/O$_2$ mixture, uses the recirculated flue gas as sweep gas at the MIEC membrane because it has oxygen contents of only 1-3 percent by volume. To increase the oxygen flux through the membrane, the air is compressed on the feed gas side and the compression energy is largely recovered downstream of the membrane through an expansion turbine. Minimizing energy losses requires a high efficiency of the compressor and turbine. Further, an external pressure vessel is required in order to realize a favorable load condition of the ceramic membrane components.

Currently available MIEC membrane materials with high oxygen permeation are unstable under CO$_2$ because the alkaline earths contained therein form carbonates with the CO$_2$ and block the membrane surface (Schulz, M., Kriegel, R., Kämpfer, A.: Assessment of CO$_2$ stability and oxygen flux of oxygen permeable membranes, J. Membr. Sc. 378 (2011), pages 10-17). For this reason, processes with no sweep gas have been developed as an alternative to the oxy-coal AC process with CO$_2$ sweep, also known as 4-end process. These alternative processes are referred to as dead-end or 3-end processes. For this purpose, as has already been mentioned, pure oxygen is generated by generating pressure differentials.

In the field of power generation, a number of patents have claimed the use of MIEC membranes for oxy-fuel combustion in coal-fired plants with the aim of CO$_2$ separation (WO 2009/065374 A3, EP 2 026 004 A1). Various method schemes aim primarily to minimize the expected efficiency losses as far as possible. In WO 2009/065374 A3, in contrast to the usually preferred overpressure processes, vacuums are applied on the permeate side. This makes possible a membrane module without high-temperature-resistant external pressure vessels, and less compression energy is consumed because only the oxygen on the permeate side of the membrane need be compressed. It is disadvantageous that the compression energy cannot be recovered in the overall process.

WO 2008/014481 and EP 2 067 937 A2 claim the generation of oxygen via MIEC membrane materials and the use thereof in the gasification power plant. In both patents, the air entering the membrane module is compressed and the compression energy is recovered through expansion turbines.

For biomass gasification, the use of MIEC membrane materials for oxygen generation is only meaningful when the energy consumption can be reduced substantially below that of typical PSA plants. The own energy requirement for MIEC membrane separation results on the one hand from the thermal energy required for maintaining the high temperature of 800-900° C. at the membrane. On the other hand, compression energy for gas compression is needed to generate the driving force for oxygen transport. To the detriment of thermotechnical integration, MIEC membrane material materials with high oxygen flux known heretofore could usually only be used within a limited temperature range. Accordingly, below approximately 830° C., the commonly used material BSCF is prone to a slow phase decomposition resulting in diminished oxygen permeation (Shao, Z., Yang, W., Cong, Y., Dong, H., Tong, J., Xiong, G.: Investigation of the permeation behavior and stability of a $Ba_{0.5}Sr_{0.5}Co_{0.8}Fe_{0.2}O_{3-\delta}$ oxygen membrane, J. of Membr. Sc. 172 (2000), pages 177-188). Moreover, the creep rate of the material increases with increasing temperature, and mechanical failure of the membrane components can come about due to the pressure differences occurring at the membrane (Pecanac, G., Baumann, S., Malzbender, J.: Mechanical properties and lifetime predictions for $Ba_{0.5}Sr_{0.5}Co_{0.8}Fe_{0.2}O_{3-\delta}$ membrane material, J. of Membr. Sc. 385-386 (2011), pages 263-268). Moreover, direct contact with synthesis gas leads to higher corrosion (Lu, H., Tong, J., Cong, Y., Yang, W.: Partial oxidation of methane in $Ba_{0.5}Sr_{0.5}Co_{0.8}Fe_{0.2}O_{3-\delta}$ membrane reactor at high pressures, Catalysis Today 104 (2005), pages 154-159) and, in some cases, to fracture of the membrane. A direct heating of the membranes with combustion gases also appears impossible because the $CO_2$ content in the flue gas leads to the membrane being covered with alkaline earth carbonates and to blockage of the oxygen permeation (Arnold, M., Wang, H., Feldhoff, A.: Influence of $CO_2$ on the oxygen permeation performance and the microstructure of perovskite-type $(Ba_{0.5}Sr_{0.5})Co_{0.8}Fe_{0.2}O_{3-\delta}$ membranes, J. of Membr. Sc. 293 (2007), pages 44-52).

Accordingly, the disadvantageous characteristics and limited conditions of use of highly-developed MIEC membrane material materials enumerated above lead to considerable limitations in the technical realization of a process-integrated membrane module for oxygen generation. There remains only the possibility of tempering the gas flows entering the membrane module in a correspondingly exact manner or providing the membrane module with additional electric heating in order to ensure operation in the optimal temperature range and to prevent contact with gases having a corrosive effect. However, this would result in elaborate, highly complex plant controls or in high additional consumption of electrical power.

It is the object of the invention to provide a possibility for energy-efficient oxygen generation in biomass gasification for increasing the efficiency of the overall process.

SUMMARY OF THE INVENTION

According to the invention, the above-mentioned disadvantages of the prior art are remedied in that a membrane module is heated directly by the synthesis gas from the biomass gasification. However, this heating should only meet less than 20%, typically less than 10% and, under optimal conditions, only approximately 5% of the heat requirement of the membrane module. The predominant portion of the heat required to heat the fresh air is taken from the exhaust air of the membrane module through heat exchange. This is enabled through the use of efficient recuperators, i.e., high-temperature heat exchangers based on high-temperature-resistant steels. Alternatively, regenerators with ceramic beds or honeycomb structures alternately traversed by fresh air and exhaust gas can be used. In this way, the majority of the heat requirement is provided independent of the process of biomass gasification through heat recovered from the exhaust gas of the membrane module.

Direct heating of the membrane module with the synthesis gas from the biomass gasification results in a simple connection to the gasification installation and is characterized by a very fast thermal response behavior and an uncomplicated control behavior. In this way, the temperature in the membrane module can be increased to its optimal operating temperature independent of the available temperature level of the gasification process. Accordingly, when using the directly gas-heated membrane module, plant-specific peculiarities of the biomass gasification plant play only a subordinate part such that incorporation in existing plants is greatly facilitated. Further, the supplied energy of the synthesis gas is exploited to the optimal extent owing to the combustion inside the membrane module.

The effect of corrosive gas constituents such as $CO_2$ or $SO_2$ on the MIEC membranes is extensively inhibited or limited through a constructive configuration of the gas flow. According to the invention, the incoming preheated fresh air is initially guided within protective tubes along the membrane tubes located therein and only then enters the actual combustion space. To this end, the outlet orifice of the protective tubes is dimensioned in such a way that the fresh air entering the combustion space reaches a velocity of at least 0.2 m/s within the gas outlet orifice. Gaseous combustion products are largely kept away from the membrane material in this way. Accordingly, the combustion of the synthesis gas takes place spatially and temporally only after fresh air contacts the membrane; that is, the combustion takes place with the oxygen-depleted air. Accordingly, the unaffected oxygen partial pressure of the incoming fresh air and, therefore, the full driving force is available for the membrane separation process on the feed side of the membrane, which results in a maximum oxygen production rate. By configuring the outlet orifice as nozzle, even the air pressure in the protective tube and, therefore, the oxygen permeation can be further increased, depending on technological requirements, without requiring an external pressure vessel for this purpose.

The driving force for oxygen transport is generated according to the invention by producing a vacuum inside the membrane components or by sweeping the membranes with water vapor. Electromechanical vacuum pumps, mechanical vacuum pumps or steam ejectors can be used for vacuum generation. Mechanical vacuum pumps, e.g., liquid ring pumps, are advantageously mechanically coupled to the gas engine to prevent losses during conversion into electrical power and back into electromechanical vacuum generation. Accordingly, the own energy requirement for oxygen generation can be further reduced compared to electromechanical pumps. If there are no consumers available for the surplus thermal energy, the waste heat can be utilized for steam generation. The steam in turn can be used for vacuum generation by means of a steam ejector such that neither electrical energy nor mechanical energy is required to generate the driving force for oxygen transport. Accordingly, a process-integrated oxygen generation is realized according to the invention without an own electrical energy requirement. This represents a significant technological and economic advantage over conventional PSA plants.

When using a steam ejector, there is a high percentage of water vapor in the oxygen as when the membranes are swept with water vapor. The water component in the oxygen can be used to regulate the temperature in the gasification zone because very high temperatures are reached during gasification with pure oxygen. An adjustment of the steam-to-oxygen ratio can be implemented in a simple manner by condensing out the excess water vapor or admixing steam.

Also, the above-stated object is met in particular through the incorporation of a membrane module with a housing and a BSCF membrane in the biomass gasification in that the housing is provided with an input for combustion gas or synthesis gas and an outlet for exhaust gas in the lower region with a connection plate and insulation overlaying the latter, in that the BSCF membrane comprises a plurality of membrane tubes which are closed at the top and open at the bottom, wherein the membrane tubes which are open at the bottom are guided through the insulation to a joint gas discharge output located in the connection plate for extraction of at least the obtained oxygen, in that there is provided at least one protective tube which is arranged over one, or some, or all of the membrane tubes and which contacts at least the insulation in the lower area such that an intermediate space is formed between the membrane tubes and protective tube and a combustion space is formed between the protective tube and housing, wherein fresh air can be supplied to the lower region of the intermediate space and combustion gas or synthesis gas can be supplied to the combustion space, and in that the protective tube has in the upper region an outlet orifice to the combustion space, which outlet orifice is opened such that the fresh air velocity at the outlet orifice is greater than 0.2 m/s.

BRIEF DESCRIPTION OF THE DRAWINGS

The invention will be described more fully in the following with reference to embodiment examples. The accompanying drawings show.

DETAILED DESCRIPTION OF EMBODIMENTS OF THE INVENTION

Figure 1:
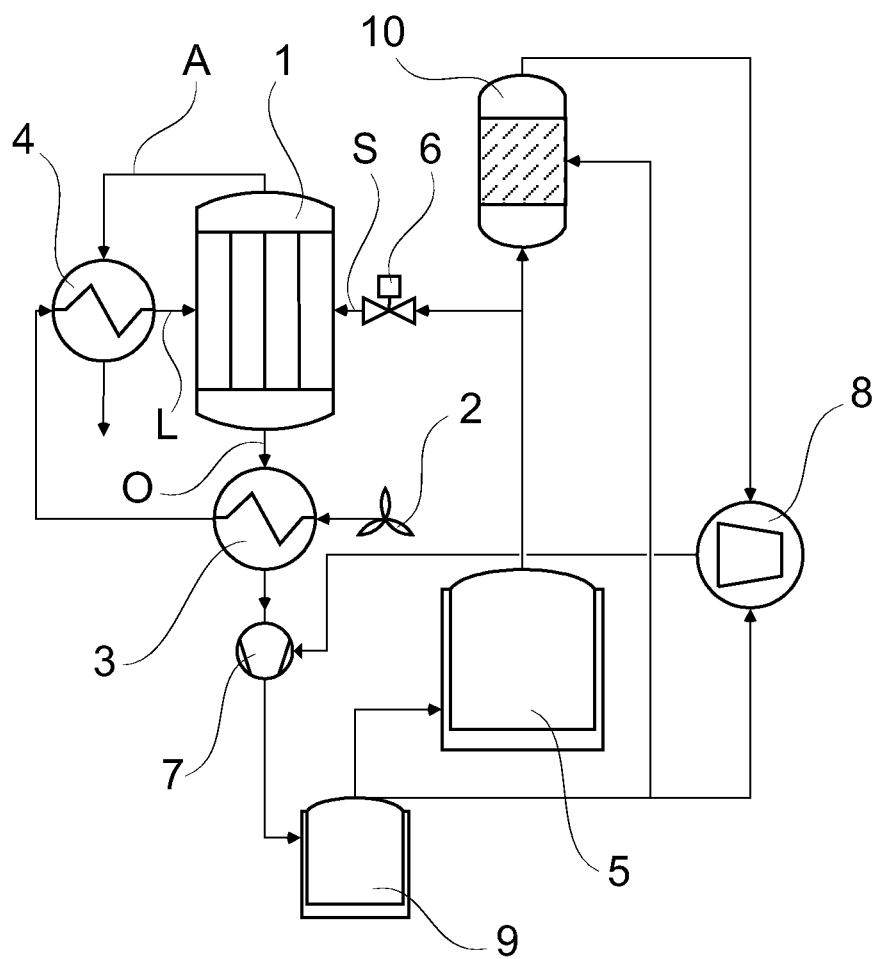
FIG. 1 incorporation of a membrane module in the biomass gasification and possibilities for the utilization of oxygen in the biomass gasification.

FIG. 1 shows an integrated oxygen generation in the biomass gasification through vacuum suction of an oxygen membrane module which is directly heated by synthesis gas and has a minimized electrical power requirement, including the essential components thereof.

The membrane module 1 for oxygen generation in the biomass gasification is outfitted with 2500 BSCF $(Ba_{0.5}Sr_{0.5}Co_{0.8}Fe_{0.2}O_{3-\delta})$ membrane tubes with a length of 700 mm. The BSCF membrane tubes which are closed on one side have an outer diameter of 3.2 mm and an inner diameter of 2.6 mm and are inserted in a vacuum-tight manner into a vacuum-tight connection plate with silicon insertion seals. The membrane module 1 is supplied with fresh air L through a radial fan or centrifugal blower 2. The fresh air L is guided for cooling the generated oxygen O via a first heat exchanger 3 and is preheated by the exhaust gas A exiting from the membrane module 1 via a second heat exchanger 4. The required residual heat for reaching the operating temperature is supplied by synthesis gas S from the gasifier 5 via a controllable gas valve 6. The occurring oxygen is sucked out by a vacuum pump 7 which is mechanically coupled to the gas engine of the CHP plant 8. Alternatively, an electromechanical vacuum pump or a steam ejector can be used. For generating the oxygen fluxes described in the following, these pumps need a volume flow rate of 150 suction m$^3$/h. The oxygen is temporarily stored in a tank 9 and is available for gasification in the gasifier 5 for the gas purification device 10 and for use in the gas engine of the CHP plant 8. At an operating temperature of the membrane module 1 of 850° C., an extraction pressure of 90 mbar on the suction side of the vacuum pump 7, and an air throughput of 260 m$^3$ SCM/h, the membrane module 1 generates 13 m$^3$ SCM O$_2$ per hour.

When using a electromechanical vacuum pump, a specific consumption of electrical energy of 0.22 kWh$_{el}$/m$^3$ SCM O$_2$ is achieved, disregarding thermal losses. The mechanical coupling of the vacuum pump 7 to the gas engine of the CHP plant 8 does not require electrical energy for oxygen generation; however, mechanical energy is taken from the CHP plant for operating the vacuum pump 7.

Figure 2:
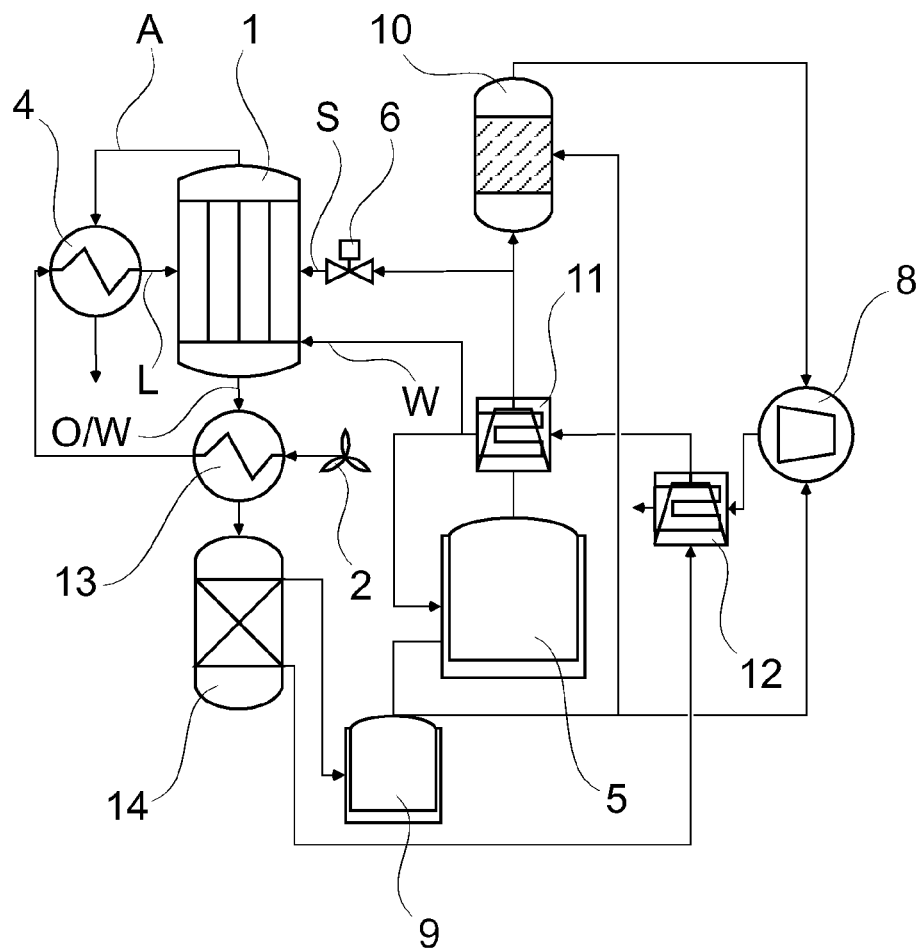
FIG. 2 a further possibility for incorporation of a membrane module in the biomass gasification and possibilities for the utilization of oxygen in the biomass gasification.

FIG. 2 shows a schematic process diagram for the generation of an oxygen-steam mixture by means of an oxygen membrane module which is directly heated by synthesis gas S.

The membrane module 1 for oxygen generation in the biomass gasification is outfitted with 1000 BSCF $(Ba_{0.5}Sr_{0.5}Co_{0.8}Fe_{0.2}O_{3-\delta})$ membrane tubes 15 with a length of 700 mm. Water vapor from a first steam generator 11 is introduced via sweep lances into the tubes which are closed on one side and which have an outer diameter of 10 mm and an inner diameter of 8 mm. The low oxygen partial pressure in the steam leads to the enrichment of the water vapor W by oxygen O. The BSCF membrane tubes and sweep lances are sealed in a vacuum-tight connection plate with O-ring compression fittings. A second steam generator 12 which utilizes the waste heat of the gas engine of the CHP plant 8 can be arranged upstream of the first steam generator 11 that is operated by hot synthesis gas S from the gasifier 5. The membrane module 1 is supplied with fresh air L through the radial fan or centrifugal blower 2. The fresh air L is guided via a condenser 13 for cooling the generated gas mixture of oxygen O and steam. The second heat exchanger 4 which is arranged downstream of the condenser 13 further heats the fresh air L flowing through in that the exhaust gas A exiting from the membrane module 1 is guided via the second heat exchanger 4. The required residual heat for reaching the operating temperature is supplied by synthesis gas S from the gasifier 5 via a controllable gas valve 6. The oxygen O is separated from the water in the liquid separator 14 arranged downstream of the condenser 13 and is conducted to the tank 9. The water condensed out in the liquid separator 14 is supplied again to the first steam generator 11 and second steam generator 12. The oxygen O in tank 9 is available for gasification in the gasifier 5, for the gas purification device 10 and for use in the gas engine of the CHP plant 8. The water content in the oxygen O can be adjusted through the temperature of the condenser 13 as well as through the admixture of steam from the steam generators (11, 12). At an operating temperature of the membrane module 1 of 850° C. and a throughput of 50 m³ SCM steam per hour at a steam pressure of approximately 1.1 bar to 1.8 bar, the membrane module 1 generates 1.5 m³ SCM $O_2$ per hour without consuming electrical energy.

Figure 3:
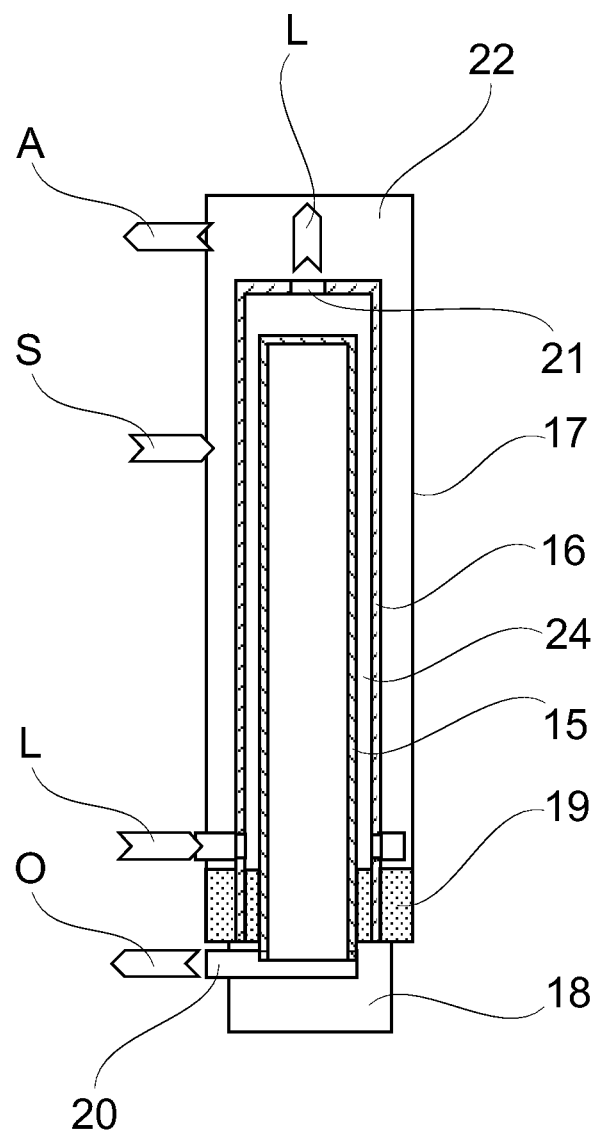
FIG. 3 a schematic diagram showing a possible incorporation of the membrane tubes in the directly heated membrane module.

FIG. 3 shows the basic construction of the membrane module 1 according to the embodiment corresponding to the above statements referring to FIG. 1. Instead of 2500 BSCF membrane tubes, only one membrane tube 15 is shown. The essential component parts of the membrane module 1, namely, the membrane tube 15, the protective tube 16 covering the latter, and the surrounding housing 17 with its metallic connection plate 18, are shown. The introduction of fresh air L into the intermediate space 24 between the membrane tube 15 and protective tube 16 takes place in the base region of the protective tube 16. Owing to the insulation 19, only a little heat can be transferred to the connection plate 18 so that the gas discharge outlet 20 for the obtained oxygen O of the membrane tube 15 is not additionally heated.

The protective tube 16 prevents a direct contact of the combustion products during operation in that the gas velocity at the outlet orifice 21 into the combustion space 22 is brought to over 0.2 m/s by adjusting the air throughput. In this way, the combustion gases can be prevented to a great extent from flowing back on the membrane tube 15.

Figure 4:
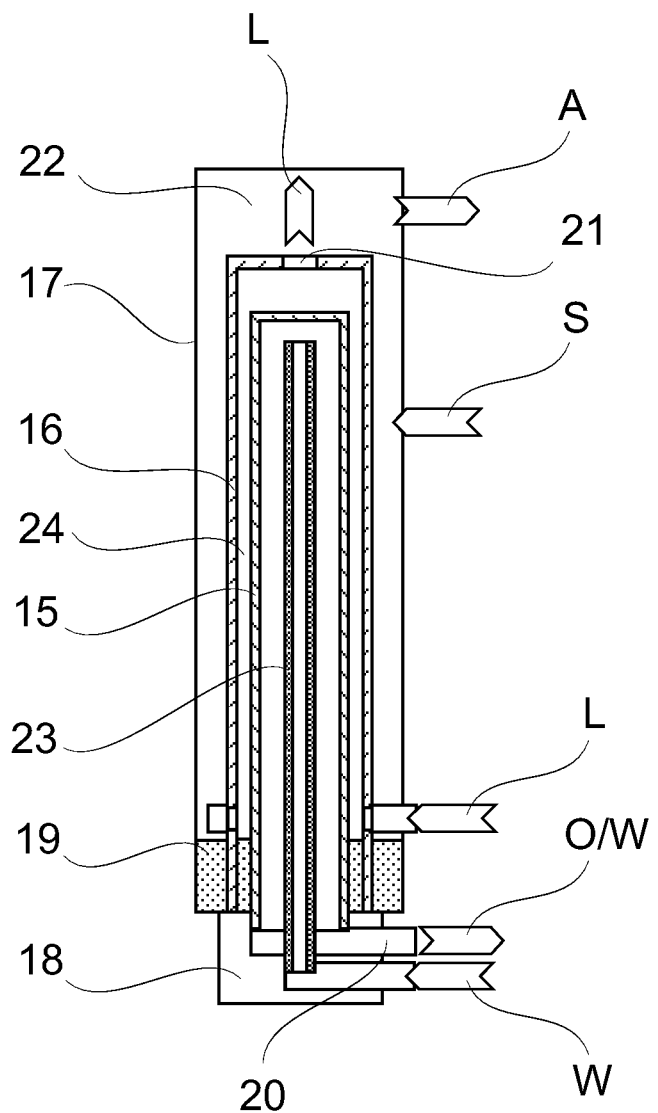
FIG. 4 a further schematic diagram showing a possible incorporation of the membrane tubes in the directly heated membrane module.

As an alternative to the construction according to FIG. 3, it is also possible to use a plurality of smaller outlet orifices 21 in the protective tube 16 or porous ceramic protective tubes 16 with an open porosity of 8 percent by volume to 25 percent by volume. At higher air throughputs, an open protective tube 16 can be used directly without narrowing if the corresponding gas velocity of more than 0.2 m/s is maintained. The arrangement of a plurality of membrane tubes 15 in a larger protective tube 16 is also possible. FIG. 4 schematically shows the basic construction of the membrane module 1 according to the embodiment corresponding to the above statements referring to FIG. 2. Here again, as was mentioned above referring to FIG. 3, only one membrane tube 15 is shown. The essential component parts of the membrane module 1, namely, membrane tube 15, the protective tube 16 covering the latter, the surrounding housing 17 with its metallic connection plate 18 and the internal sweep lance 23, are shown. The sweep lance 23 is required only when using water vapor W as sweep gas. As can easily be seen, exhaust air can also be guided back without entering the combustion space 22, but this would require a more complicated solution. In this case, the combustion air must be supplied separately. This makes management of the gases more complicated because the hot, oxygen-reduced air must then also be discharged via the connection plate 18, or further outlet orifices 21 must be arranged for the outlet of the oxygen-reduced air. In this case, it is useful to integrate the fresh air L/exhaust gas heat exchanger in the connection plate 18 of the membrane module 1.

LIST OF REFERENCE CHARACTERS 1 membrane module
2 radial fan or centrifugal blower
3 first heat exchanger
4 second heat exchanger
5 gasifier
6 controllable gas valve
7 vacuum pump
8 gas engine of the CHP plant
9 tank
10 gas purification device
11 first steam generator
12 second steam generator
13 condenser
14 liquid separator
15 membrane tube
16 protective tube
17 housing
18 connection plate
19 insulation
20 gas discharge output
21 outlet orifice
22 combustion space
23 sweep lance
24 intermediate space
L fresh air
S synthesis gas
A exhaust gas
O oxygen
W water vapor

What is claimed is:

1. A membrane module for the separation of oxygen from air, wherein the module comprises: an oxygen-permeable mixed conducting membrane and a housing for the mixed conducting membrane, and wherein
the housing comprises an inlet for combustion gas or synthesis gas and an outlet for exhaust gas, and further comprises an open lower end which has an insulation and a connection plate arranged thereon;
the mixed conducting membrane comprises a plurality of membrane tubes which are closed on one side and open on the other side, an open end of a membrane tube passing through the insulation to a joint gas discharge output located in the connection plate for withdrawing separated oxygen;
a protective tube is arranged over a single membrane tube or over all or at least a part of the plurality of membrane tubes and has an open end which contacts the insulation to form an intermediate space for supplied fresh air between the membrane tube or membrane tubes and the protective tube and a combustion space for supplied combustion gas or synthesis gas between the protective tube and the housing; and
the protective tube comprises one or more outlet orifices to the combustion space or comprises a porous ceramic tube with an open porosity of 8 percent by volume to 25 percent by volume.

2. The membrane module of claim 1, wherein the protective tube comprises one or more outlet orifices to the combustion space.

3. The membrane module of claim 2, wherein the one or more outlet orifices allow a velocity of fresh air at the one or more outlet orifices to be greater than 0.2 m/s.

4. The membrane module of claim 1, wherein the protective tube comprises a porous ceramic tube with an open porosity of 8 percent to 25 percent by volume.

5. The membrane module of claim 1, wherein the protective tube is arranged over a single membrane tube of the plurality of membrane tubes.

6. The membrane module of claim 1, wherein the protective tube is arranged over all or at least a part of the plurality of membrane tubes.

7. The membrane module of claim 1, wherein a tubular sweep lance is arranged inside each of the membrane tubes for sweeping with water vapor.

8. The membrane module of claim 1, wherein the mixed conducting membrane is a $Ba_{0.5}Sr_{0.5}Co_{0.8}Fe_{0.2}O_{3-\delta}$ (BSCF) membrane.

9. A method for energy-efficient oxygen generation in biomass gasification, wherein the method comprises: employing the membrane module of claim 1 and using the gas exiting the membrane module to heat the incoming fresh air, more than 50% of heat energy contained in the gas exiting the membrane module being utilized to preheat the fresh air, and wherein the fresh air is further heated to a temperature of from 800° C. to 900° C. by directly feeding combustion gas or synthesis gas from the biomass gasification into the combustion space of the membrane module.

10. The method of claim 9, wherein a vacuum is generated inside the mixed conducting oxygen-permeable membrane by an electromechanical or mechanical vacuum pump or by a steam ejector.

11. The method of claim 10, wherein the combustion gas or synthesis gas from the biomass gasification is fed into a gas engine of a CHP plant, and a mechanical vacuum pump is mechanically coupled to the gas engine.

12. The method of claim 9, wherein the combustion gas or synthesis gas from the biomass gasification is fed into a gas engine of a combined heat and power (CHP) plant, and a mechanical vacuum pump is mechanically coupled to the gas engine.

13. The method of claim 9, wherein the fresh air entering the membrane module is heated with energy from the gas exiting from the membrane module via one or more recuperators.

14. The method of claim 9, wherein the fresh air entering the membrane module is heated with energy from the gas exiting from the membrane module via one or more regenerators.

15. The method of claim 9, wherein the mixed conducting membrane of the membrane module is a BSCF membrane.

\* \* \* \* \*